US012607067B2

(12) United States Patent
Charlton

(10) Patent No.: US 12,607,067 B2
(45) Date of Patent: Apr. 21, 2026

(54) LADDER SAFETY DEVICE

(71) Applicant: Condor Peak, LLC, West Valley City, UT (US)

(72) Inventor: Craig Charlton, Brisbane (AU)

( * ) Notice: Subject to any disclaimer, the term of this patent is extended or adjusted under 35 U.S.C. 154(b) by 153 days.

(21) Appl. No.: 18/579,298

(22) PCT Filed: Sep. 13, 2022

(86) PCT No.: PCT/US2022/076344

§ 371 (c)(1),
(2) Date: Jan. 12, 2024

(87) PCT Pub. No.: WO2023/288340

PCT Pub. Date: Jan. 19, 2023

(65) Prior Publication Data

US 2024/0337156 A1 Oct. 10, 2024

(51) Int. Cl.
*E06C 7/48* (2006.01)

(52) U.S. Cl.
CPC .................................... *E06C 7/486* (2013.01)

(58) Field of Classification Search
CPC ... E06C 7/48; E06C 7/486; E06C 1/34; E06C 7/188; B25B 5/163; B25B 1/2405; B25B 1/2452; F16B 2/10; F16B 2/12
See application file for complete search history.

(56) References Cited

U.S. PATENT DOCUMENTS

| | | | | |
|---|---|---|---|---|
| 4,251,066 | A * | 2/1981 | Bowling | B25B 1/2405 269/283 |
| 4,583,724 | A * | 4/1986 | Huang | B25B 1/2405 269/283 |
| 4,861,010 | A | 8/1989 | Neil | |
| 8,316,993 | B1 * | 11/2012 | Rudd | E06C 7/48 182/107 |
| 10,017,990 | B2 * | 7/2018 | Charlton | E06C 7/486 |
| 11,041,341 | B1 | 6/2021 | Harris et al. | |
| 2006/0124394 | A1 | 6/2006 | Bracken et al. | |
| 2009/0145693 | A1 * | 6/2009 | Arseneault | E06C 7/486 182/206 |
| 2014/0166397 | A1 | 6/2014 | Reynolds | |
| 2014/0174853 | A1 | 6/2014 | Charlton | |
| 2016/0281428 | A1 | 9/2016 | Rudd | |

* cited by examiner

*Primary Examiner* — Abe Massad
(74) *Attorney, Agent, or Firm* — Dobbin IP Law, P.C.; Geoffrey E. Dobbin

(57) ABSTRACT

A ladder safety device (100) is usable for holding and stabilizing a ladder in a safe and stable manner while being used, by way of securing a ladder relative to continuous horizontal guttering at the edge of a building. The device (100) locks to the gutter by way of locking jaws (130), (160) and is secured to the side rail of a ladder by way of an adjustable locking bar (140). Improvements to the initial design include an adjustable jaw (134) for clamping different thicknesses of gutter or other support material, selectable jaw strips (164*a*) to accommodate different types of gutters, and a ratcheting height adjustment carriage (150) for the locking bar (140) to accommodate different sizes of ladder rails.

12 Claims, 18 Drawing Sheets

LADDER SAFETY DEVICE

CROSS-REFERENCES TO RELATED APPLICATIONS

The present Application claims priority to prior filed U.S. Application No. 63/221,847, filed Jul. 14, 2021, and incorporates the same herein by reference in its entirety.

FIELD OF THE INVENTION

This invention relates to an improved ladder safety device usable for holding a ladder in a safe and stable disposition while being used.

BACKGROUND OF THE INVENTION

Many forms of apparatus and devices have been proposed in the past with a view to reducing accidents occasioned by lateral slippage of ladders placed against buildings or other structures, especially against lengths of horizontal drainage guttering. A lengthy discussion on the danger factors is to be found in the specification of International Patent Application No. PCT/AU02/00071 which is directly tied to the use of flexible connecting straps encircling ladder rungs and/or rails and having releasable engagement means securable where desired. Somewhat similar principles are illustrated in other patent specifications such as U.S. Pat. No. 4,924,971 to Rice and 4,545,460 to Byrd.

A prior invention was developed by the Inventor's father, Robert F. Charlton and is embodied in U.S. Pat. Nos. 9,085,937 and 10,017,990, which are incorporated herein in their entirety by reference. This invention had been devised to provide a different approach to the problem of obtaining ladder stability, preferably without using flexible straps. Accordingly, its principal object was to provide a novel form of safety device which can be used more easily and positively than prior proposals, with low cost and simplicity, yet proving highly efficient in operation. Specifically, and among many other improvements, the prior ladder safety device featured an over-center jaw which would clamp onto a roof gutter and a sliding latch which would contact a ladder rail, thereby securing the device to the ladder and gutter simultaneously. The latch was positioned upon a platform which could be raised and lowered to better accommodate different ladder dimensions.

The present invention encompasses three improvements to the prior design by providing a quick-adjustment feature to the raising and lowering of the latch, selectable jaw strips to accommodate different types of gutters, and an adjustable jaw to accommodate different thicknesses of gutters.

SUMMARY OF THE INVENTION

Throughout the specification, the safety devices are described by way of example in the principal application in securing a ladder relative to continuous horizontal guttering at the edge of a building. Such guttering typically has an inner web, a floor, and an outer web, the latter terminating in a roll-formed bead which may be of desired form such as circular, triangular, or square in cross-section or simply flanged. The words "bead of the type described" are used herein to embrace any such structure against which the ladder may be placed regardless of design. If desired, it could be any rail type member, with or without conventional types of guttering. According to one aspect of the invention, there is provided a ladder safety device for stabilizing a ladder leaning against a horizontal bead of the type described, secured adjacent the edge of a building, said safety device including a portable, hand-held, jaw-mounting body having first and second jaw members adapted, when the device is inoperative, to be spaced from one another whereby the device may be brought to usage position and the body fitted over the bead so that the bead is accommodated between the two jaw members; actuating means associated with said body and adapted to be manually actuated to cause closing together of the jaw members and effect clamping of the bead relative thereto, and ladder securing means on the jaw-mounting body and adapted to be secured to the ladder to restrain relative motion between the ladder and the body when the device has been brought to usage position and said actuating means has been rendered operative.

The prior art, shown in U.S. Pat. Nos. 9,085,937 and 10,017,990, the jaw-mounting body includes a lower body portion on which said first jaw member is mounted substantially fixedly but adapted to be adjustably set in selected position beneath and outwardly of said bead. Preferably also, the jaw-mounting body includes an upper body portion on which said second jaw member is mounted for pivotal movement about a horizontal axis between said raised inoperative positions spaced from the first jaw member and a lower clamping position in which it co-acts with the first jaw member and is disposed inwardly of said bead. Suitably, pivotal movement of the second jaw member is effected by a handle member pivotally connected thereto about a horizontal axis, the parts being so made and arranged that the handle is pivotally raised when the jaw members are spaced and inoperative but is swung down to a lower operative position adjacent the first jaw member when clamping is effected. Other enhancements to and the operation of the ladder safety device are described in these reference patents and will not be repeated herein.

The present invention relates to three improvements to the original ladder safety device design, together creating a more preferred embodiment than the use of one feature alone. In one embodiment, the mandible (second) jaw of the ladder safety device is fitted with an adjustable, or even selectable, crown, allowing for the accommodation of different widths and shapes of guttering. The second improvement mounts the ladder locking bar of the ladder safety device on a carriage which is alternately raised and lowered in a ratcheting relationship, allowing for rapid securement of ladder rails while inhibiting accidental release of the same. The third improvement involves providing replaceable elastomeric strips on the maxilla jaw to accommodate different shaped gutters. The more important features of the invention have thus been outlined in order that the more detailed description that follows may be better understood and in order that the present contribution to the art may better be appreciated. Additional features of the invention will be described hereinafter and will form the subject matter of the claims that follow.

Many objects of this invention will appear from the following description and appended claims, reference being made to the accompanying drawings forming a part of this specification wherein like reference characters designate corresponding parts in the several views.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

In order that the invention may be more readily understood and put into practical effect, reference will now be made to the accompanying drawings wherein.

REFERENCE NUMBERS USED IN THE DRAWINGS

Figure 1:
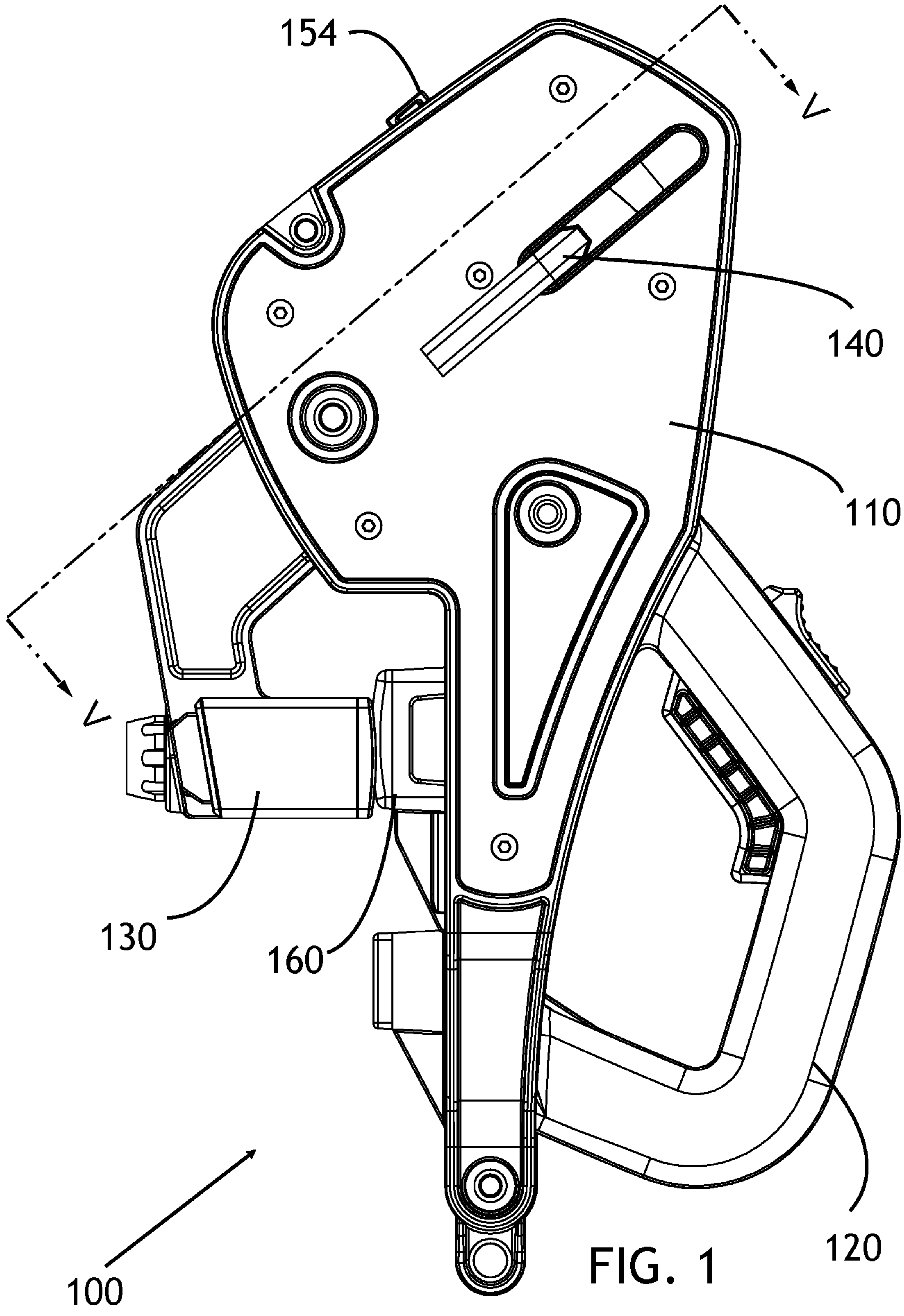
FIG. 1 is a side elevation of an improved ladder safety device according to one embodiment of the invention, the carriage in a lowered position.
Figure 2:
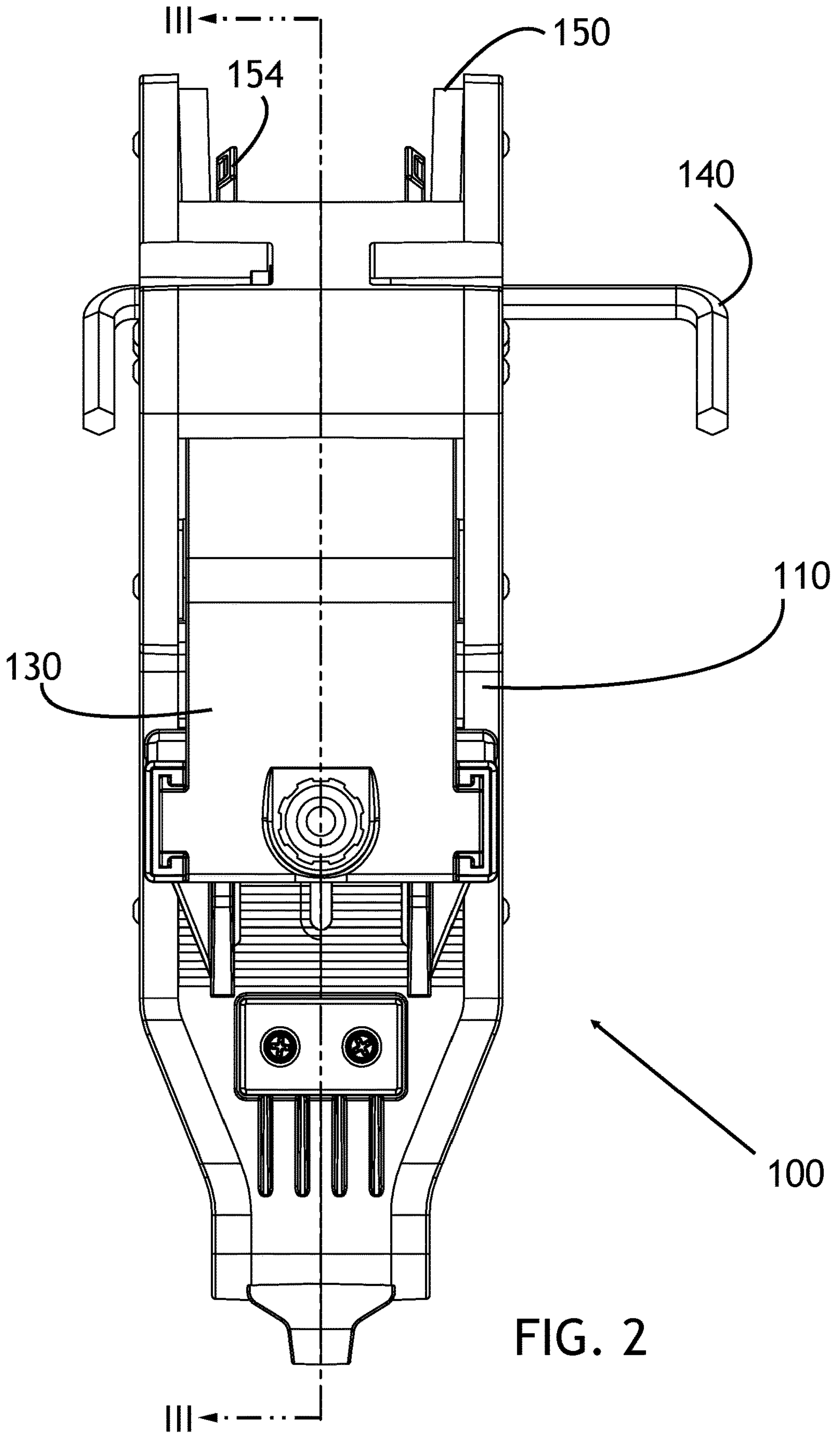
FIG. 2 is a rear elevation the device illustrated in FIG. 1.

The following reference numbers are used consistently throughout the Application:

100-one embodiment of a ladder safety device according to the present invention;
110-body of the ladder safety device;
112-body ratchet teeth matrix;
120-handle;
122-handle pivot;
130-mandible jaw,
131-linkage between mandible jaw and handle;
132-mandible jaw body;
133-mandible jaw pivot;
134-mandible jaw adjustment bolt;
135-jaw socket;
136-adjustable crown;
140-locking bar;
142-leaf locks;
146-lock springs;
150-lock carriage;
152-carriage ratchet tooth;
154-carriage tab;
156-ratchet springs;
158-carriage spring;
160-maxilla jaw;
162-maxilla cradle;
**164*a***-first alternate maxilla strip;
**164*b***-second alternate maxilla strip;
230-alternate mandible jaw;
235-mandible cradle;
236-selectable mandible strip;
238-mandible attachment clip;
262-alternate maxilla cradle;
264-third alternate maxilla strip;
268-maxilla attachment clip.

DETAILED DESCRIPTION OF THE PREFERRED EMBODIMENTS OF THE INVENTION

With reference now to the drawings, the preferred embodiment of the ladder safety device is herein described. It should be noted that the articles “a”, “an”, and “the”, as used in this specification, include plural referents unless the content clearly dictates otherwise.

As shown in the FIGS. 1-4, the device indicated generally at (100) features a body (110) with a handle (120) pivotably mounted (122) on one side thereof (to be defined as the front). A mandible jaw (130) is likewise pivotably mounted upon the body and defines a back of the ladder safety device. A locking bar (140) extends through an upper portion of the body (110) and is mounted within a carriage (150).

Figure 3:
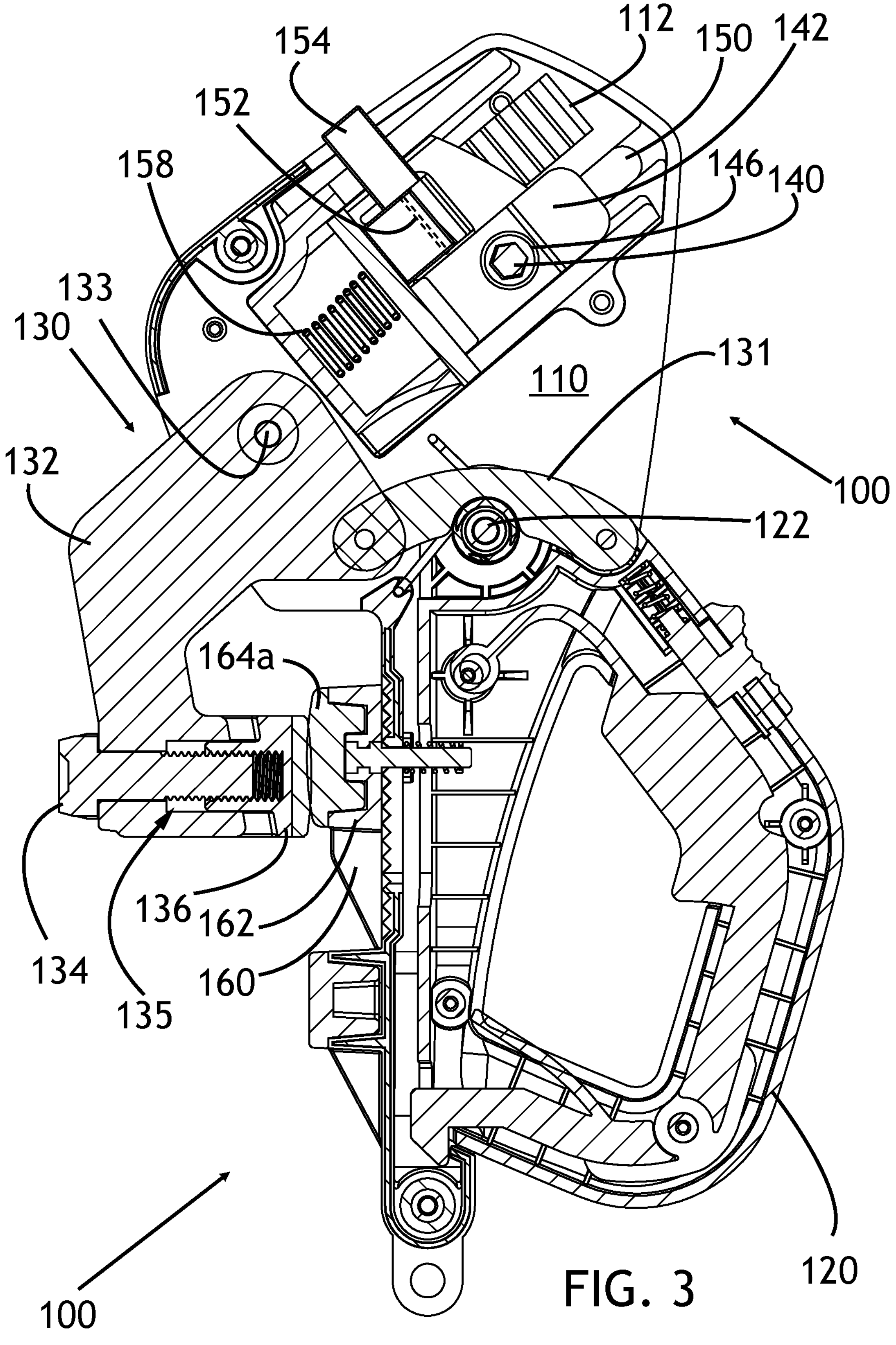
FIG. 3 is a sectional view of the ladder safety device of FIG. 2, taken along line III-III, the crown of the mandible jaw being set at a first position.
Figure 4:
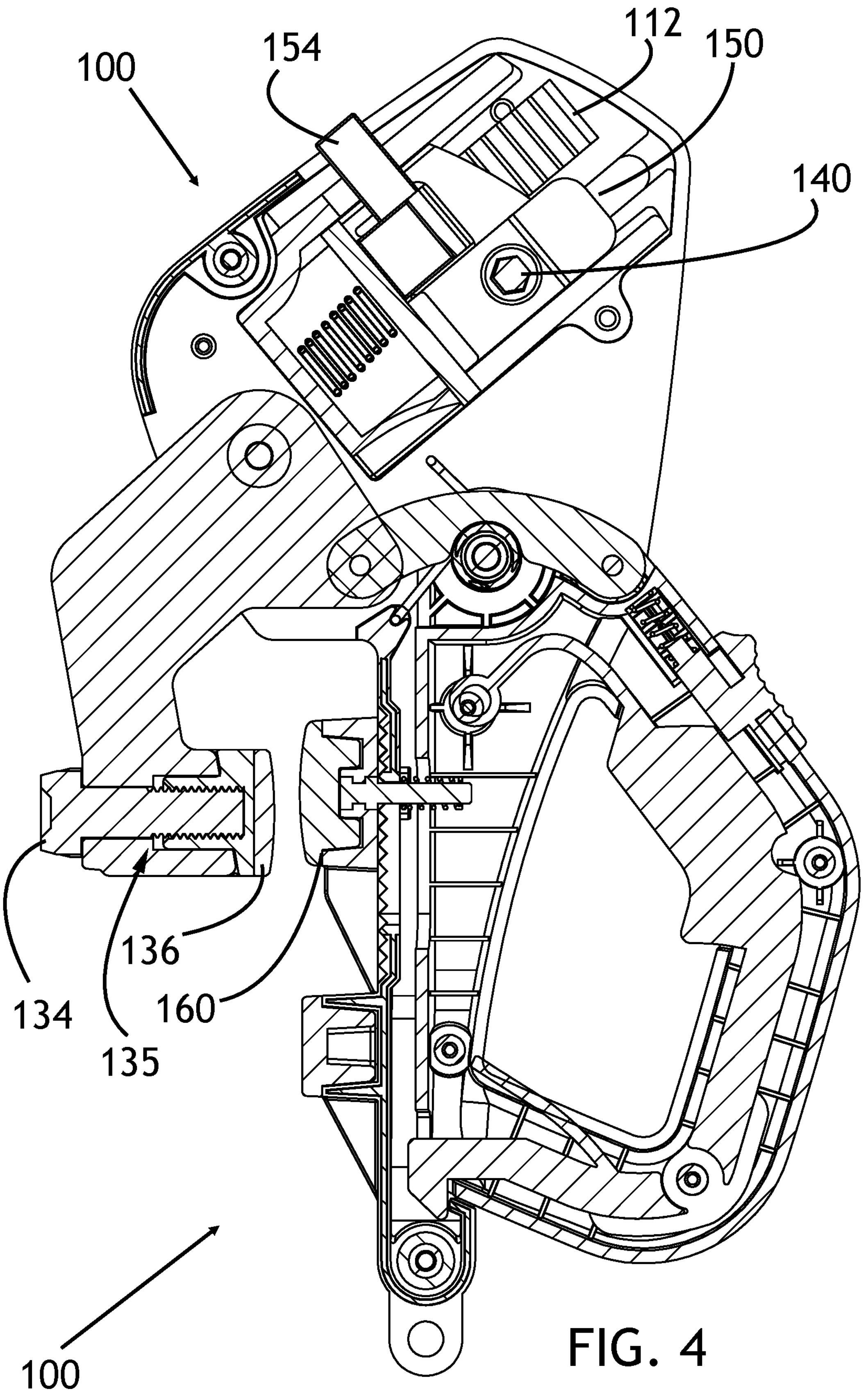
FIG. 4 is a sectional view of the ladder safety device of FIG. 3, the crown of the mandible jaw being set at a second position.
Figure 5:
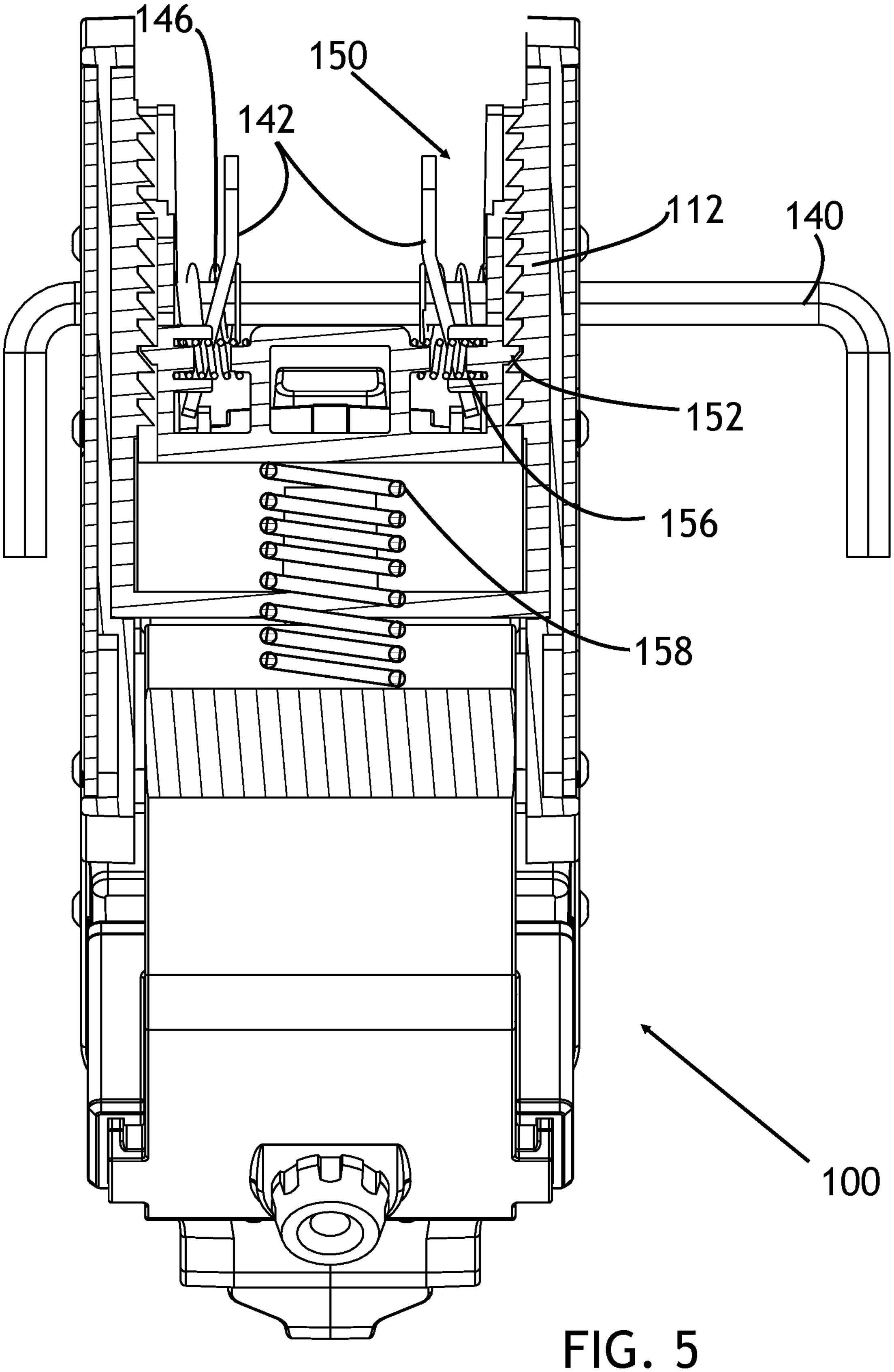
FIG. 5 is a sectional view of the ladder safety device of FIG. 1, taken along line V-V.
Figure 6:
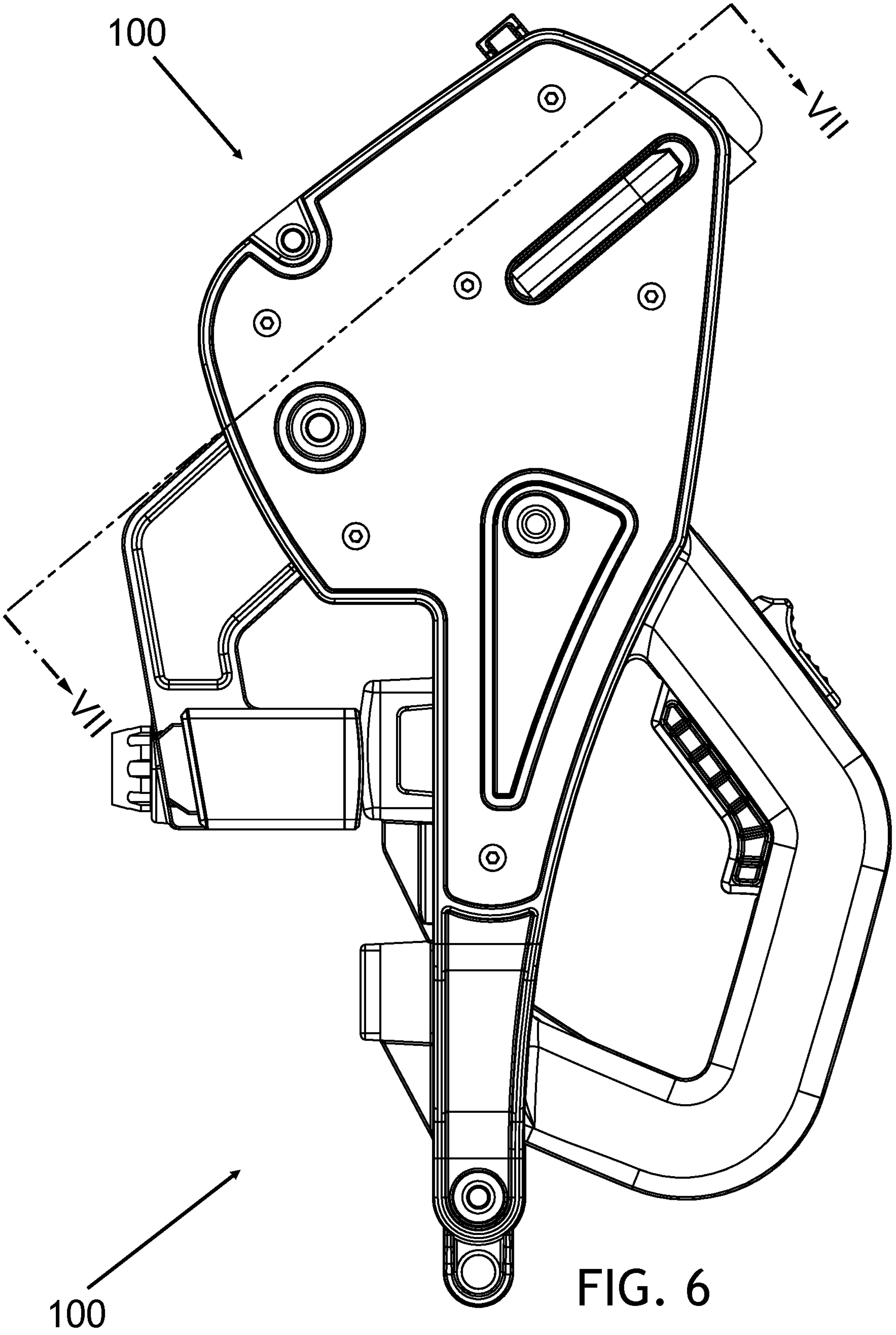
FIG. 6 is a side elevation of an improved ladder safety device according to one embodiment of the invention, the carriage in a raised position.
Figure 7:
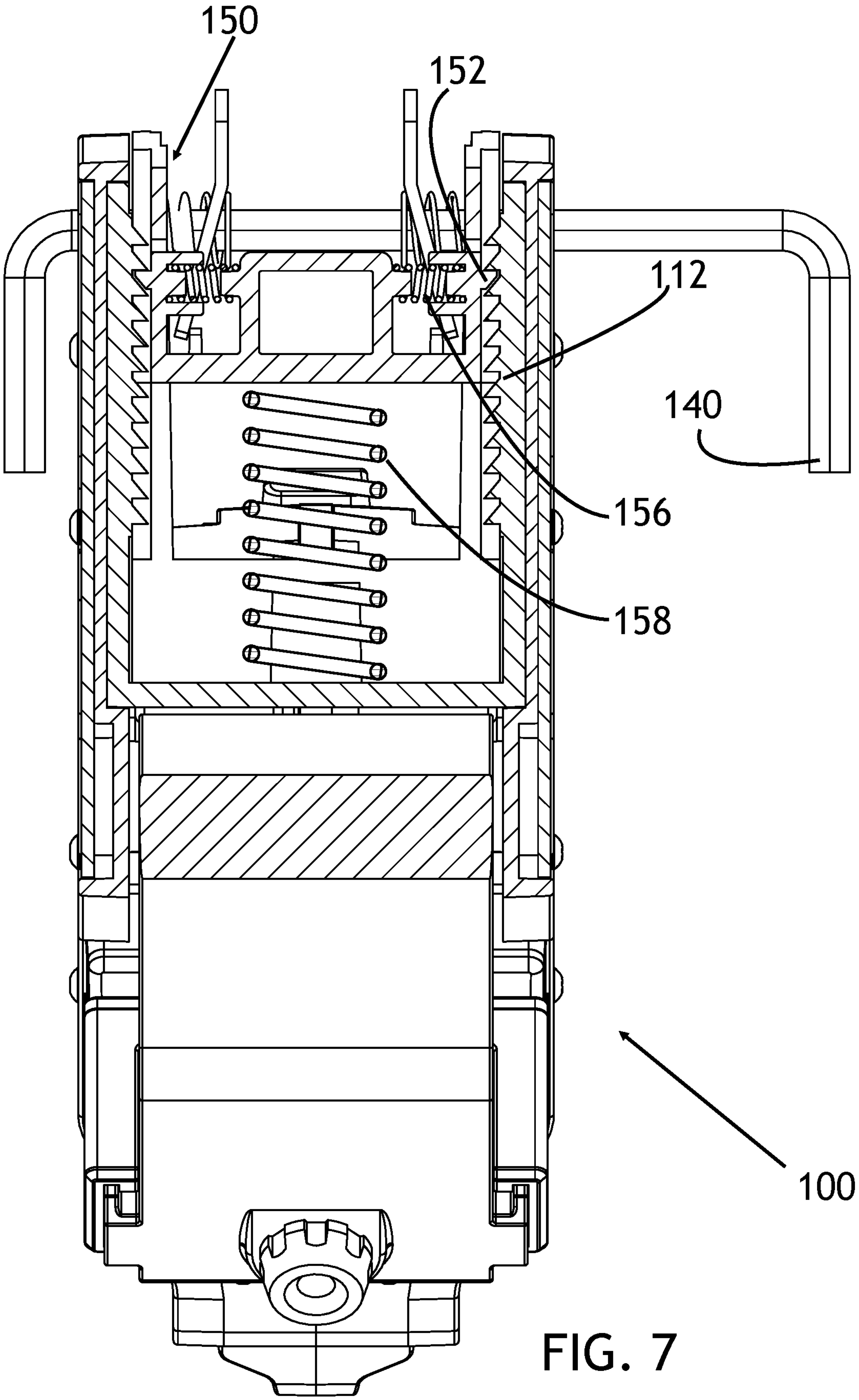
FIG. 7 is a sectional view of the ladder safety device of FIG. 6, taken along line VII-VII.
Figure 8:
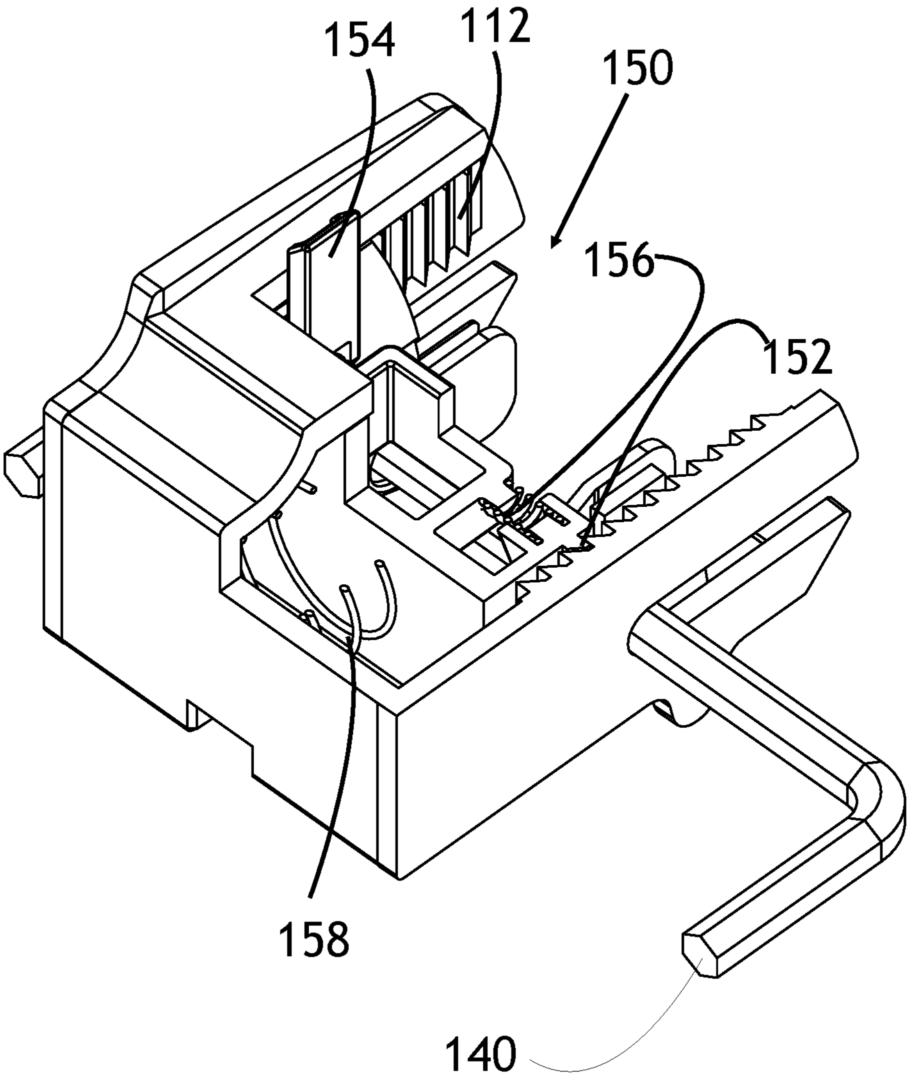
FIG. 8 is a partial section of the cradle and locking bar raise/lower mechanism, in a low position.
Figure 9:
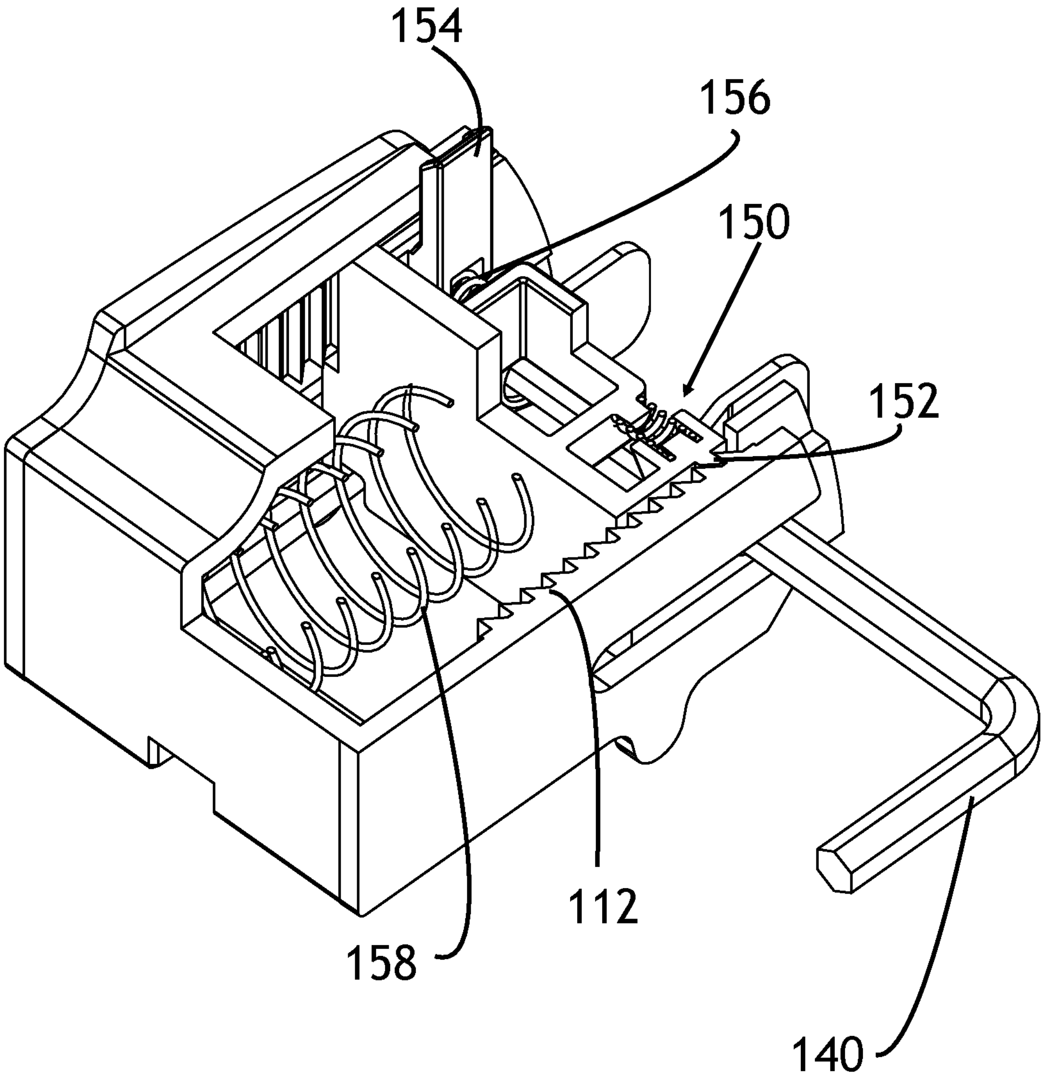
FIG. 9 is a partial section of the cradle and locking bar raise/lower mechanism, in a high position.
Figure 10:
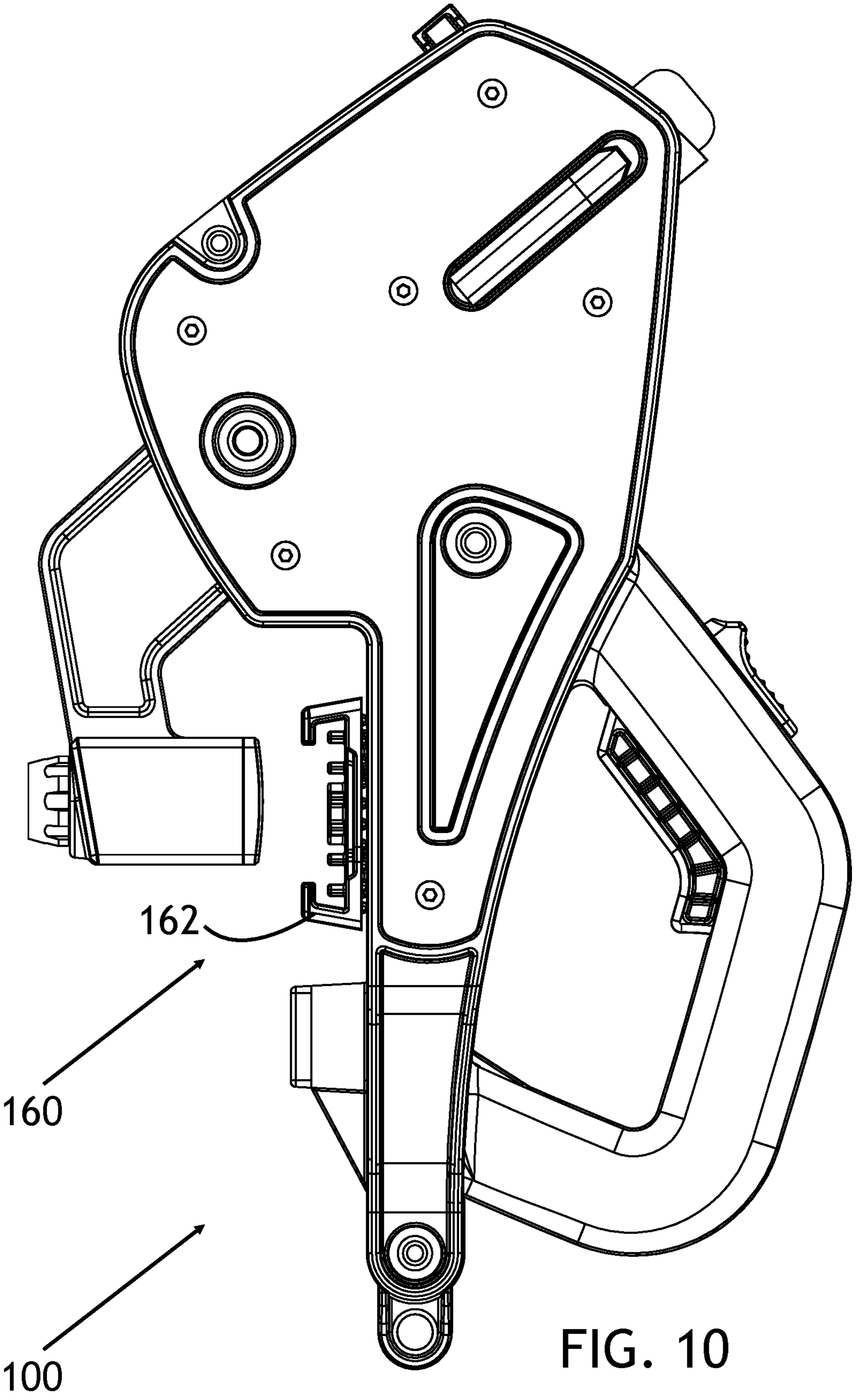
FIG. 10 is a side elevation of the improved ladder safety device with the maxilla strip removed.
Figure 11:
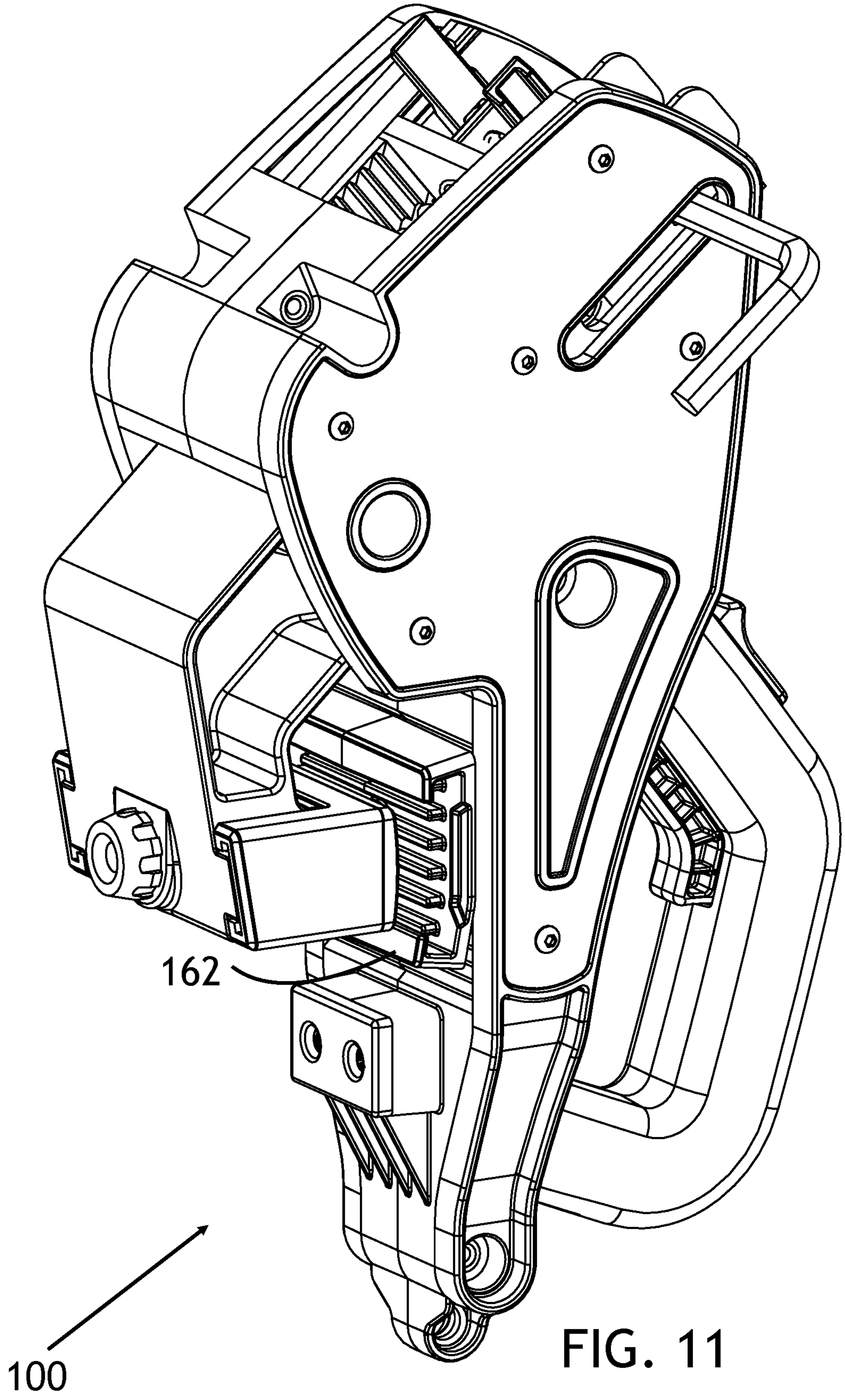
FIG. 11 is a perspective view of the improved ladder safety device of FIG. 10.
Figure 12:
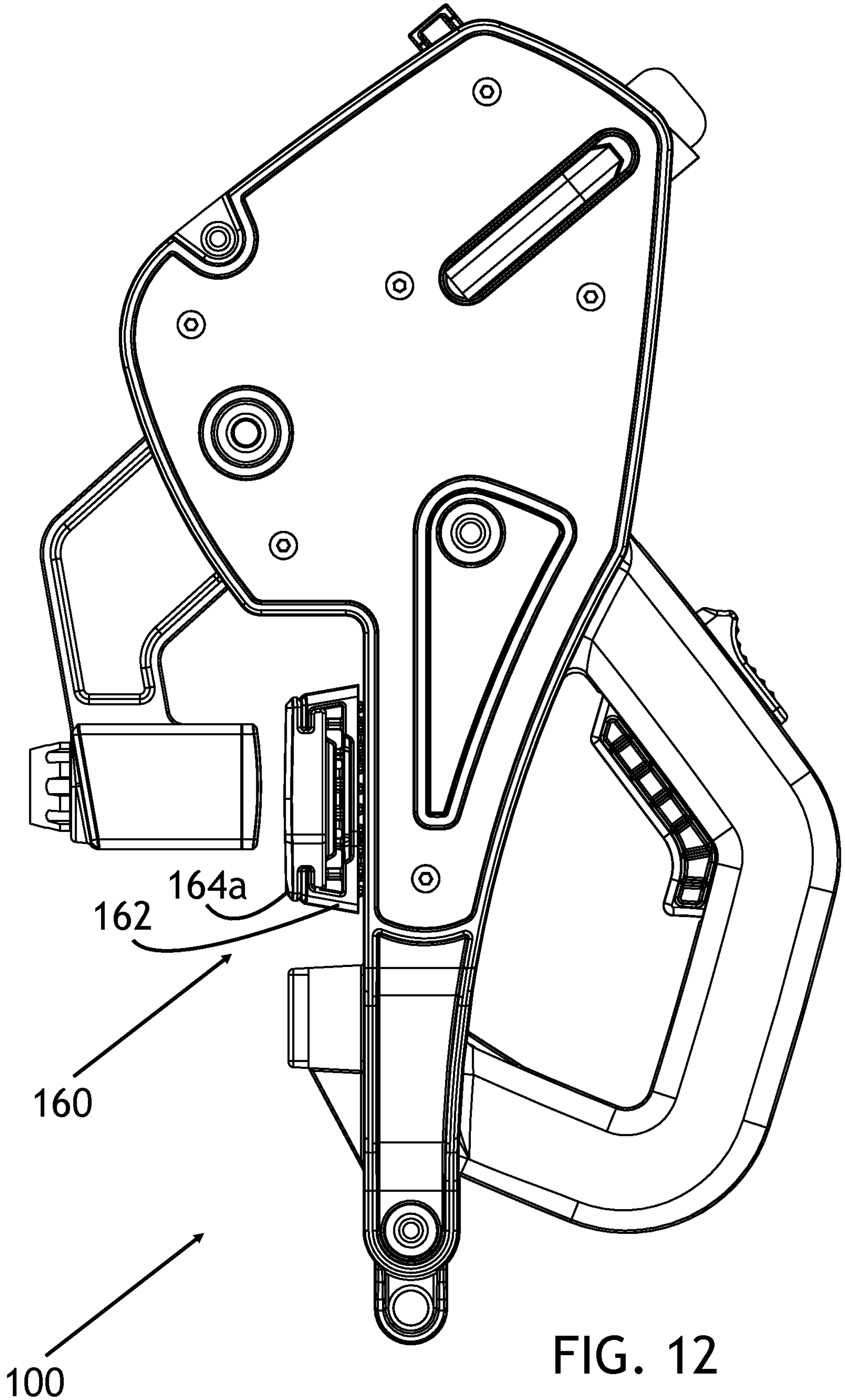
FIG. 12 is a side elevation of the improved ladder safety device with a first alternate maxilla strip installed.
Figure 13:
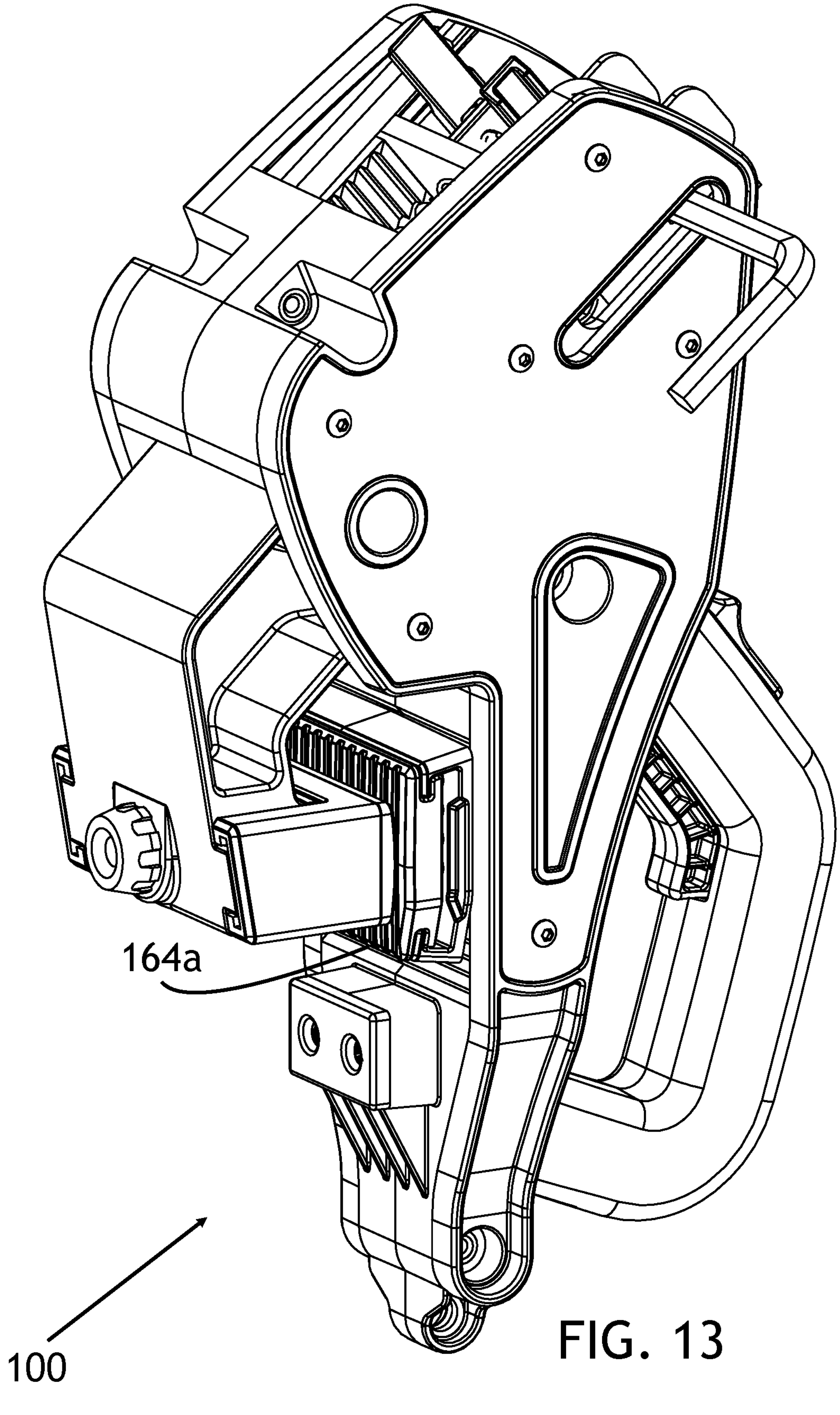
FIG. 13 is a perspective view of the improved ladder safety device of FIG. 12.
Figure 14:
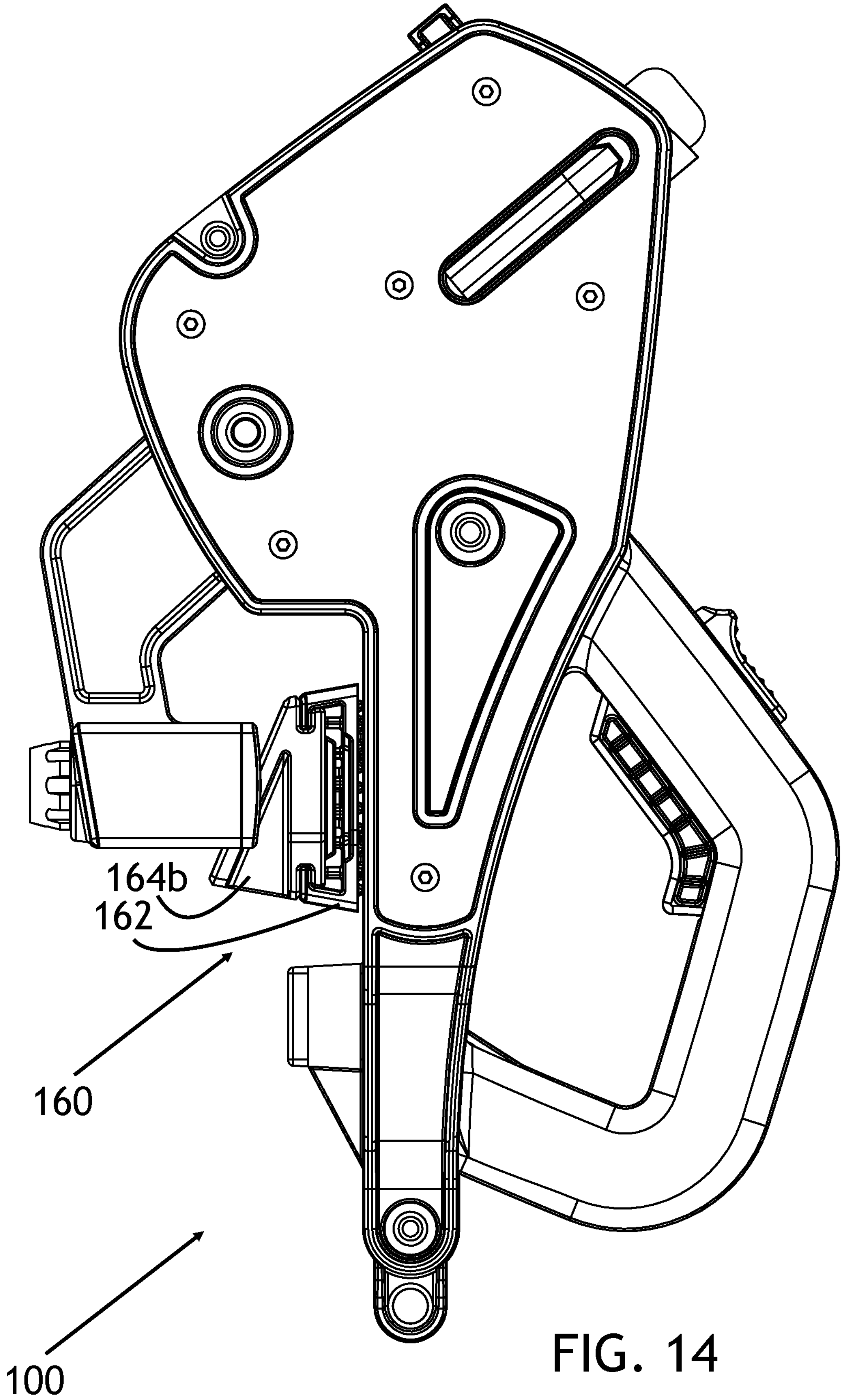
FIG. 14 is a side elevation of the improved ladder safety device with a second alternate maxilla strip installed.
Figure 15:
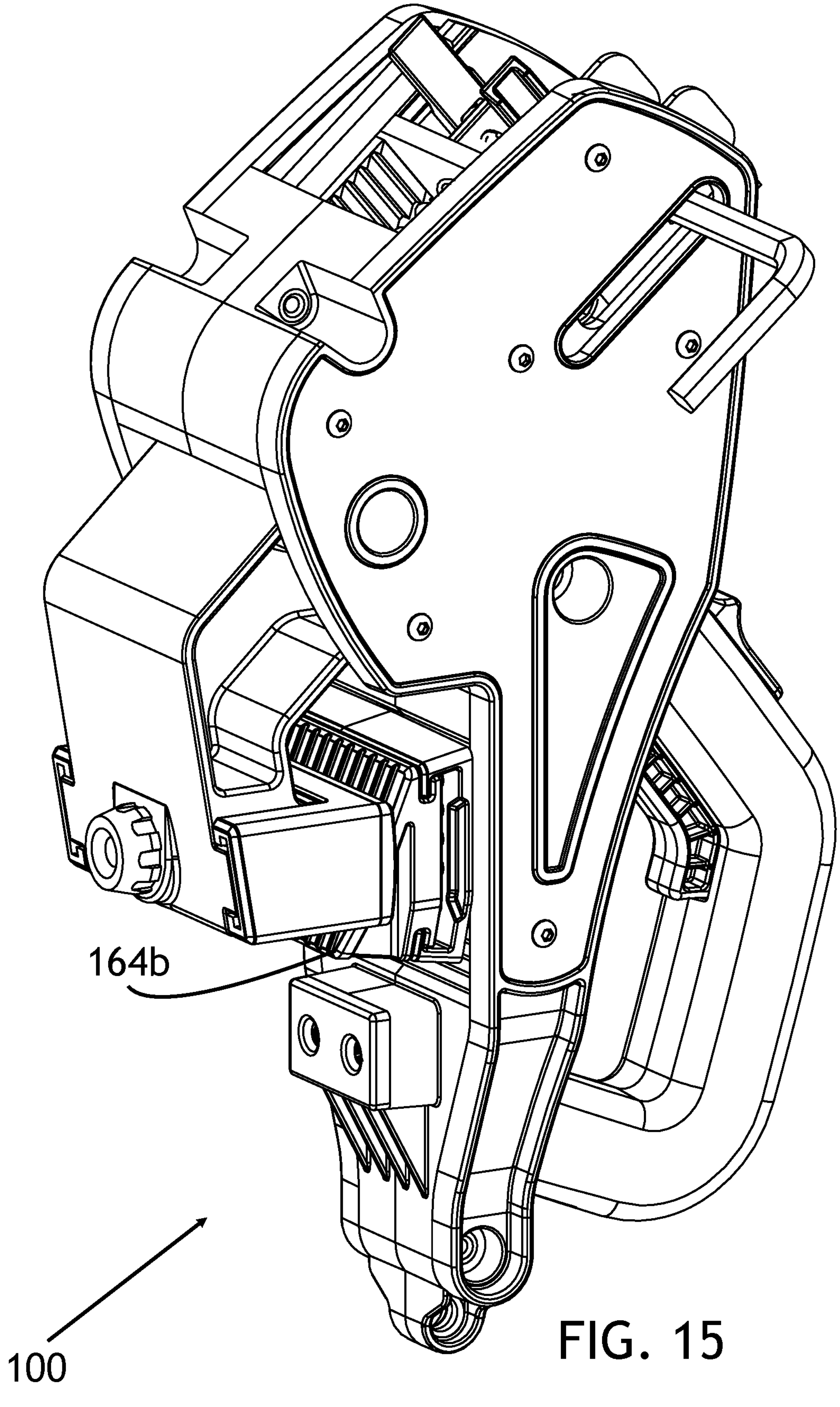
FIG. 15 is a perspective view of the improved ladder safety device of FIG. 14.

As can be seen in FIG. 3, a linkage (131) connects the handle (120) to the mandible jaw (130) and forces it open about the jaw pivot (133). Jaw body (132) terminates at crown (136), which interfaces with the gutter against maxilla (138). Crown (136) is mounted upon an adjustment bolt (134) which may be used to draw crown (136) into or out of a socket (135) within the mandible body (132). This motion then allows a space to be formed between crown (136) and maxilla (160) (FIG. 4) which may be used to accommodate different sized and thicknesses of gutter. The use of adjustment bolt (134) and its threaded interface with crown (136) also allows for different shaped crowns to be utilized.

A further improvement to the mechanism is the mounting of adjustable locking bar (140) on carriage (150), shown in FIGS. 1, 5-9. In use, the locking bar 47 may slide to either side of the device and can then secure the ladder on either side of the safety device. The locking bar (140) is held in position by the interaction of two opposed leaves (142). The leaves (142) are angled to oppose motion of the locking bar (140) in one of the two possible directions unless the opposing leaf (142) is forced against the provided spring (146). The locking bar (140) may also be raised and lowered relative to the safety device (FIGS. 1 and 6) and secured in position, thereby being able to be adjusted up or down to secure ladders of varying rail widths. This raise-and-lower mechanism is a carriage (150) into which the locking bar (140) and its assembly are mounted. The carriage (150) has at least one ratchet tooth (152) that interfaces with a body ratchet tooth matrix (112) to secure the carriage (150) in a desired position and prevent accidental raising of the carriage (150). In use, the carriage (150) starts are an uppermost position and is pushed downwards, with the direction of the ratchet teeth and against spring pressure (158), until the locking bar (140) interfaces with a ladder rail. The ladder rail prevents further downward motion. To raise the carriage (150) and release the ladder rail, biased tabs (154), on which the at least one tooth (152) is located, are squeezed inwards, releasing the at least one carriage tooth (152) and allowing upwards motion assisted by the spring (158). Springs (156) return the tabs (154), and the associated teeth (152), into the engaged position. It should be noted that the spring pressure may be provided by the inherent resistance to deformation of the material forming the tabs (154) themselves.

The third improvement is the use of a maxilla cradle (162) which secures any of alternate maxilla strips (164*a*), (164*b*) to adjust the maxilla (160) to receive different shapes of gutter, shown in FIGS. 10-15. Maxilla (160) is manufactured with cradle (162) defining a negative space containing retention structures. Strips (164*a*), (164*b*) are manufactured to fit within the negative space defined by cradle (162) and to comport with standard gutter designs. In this manner, the strips (164*a*), (164*b*) may be selected for a particular job and may also be replaced after wear or damage.

Figure 16:
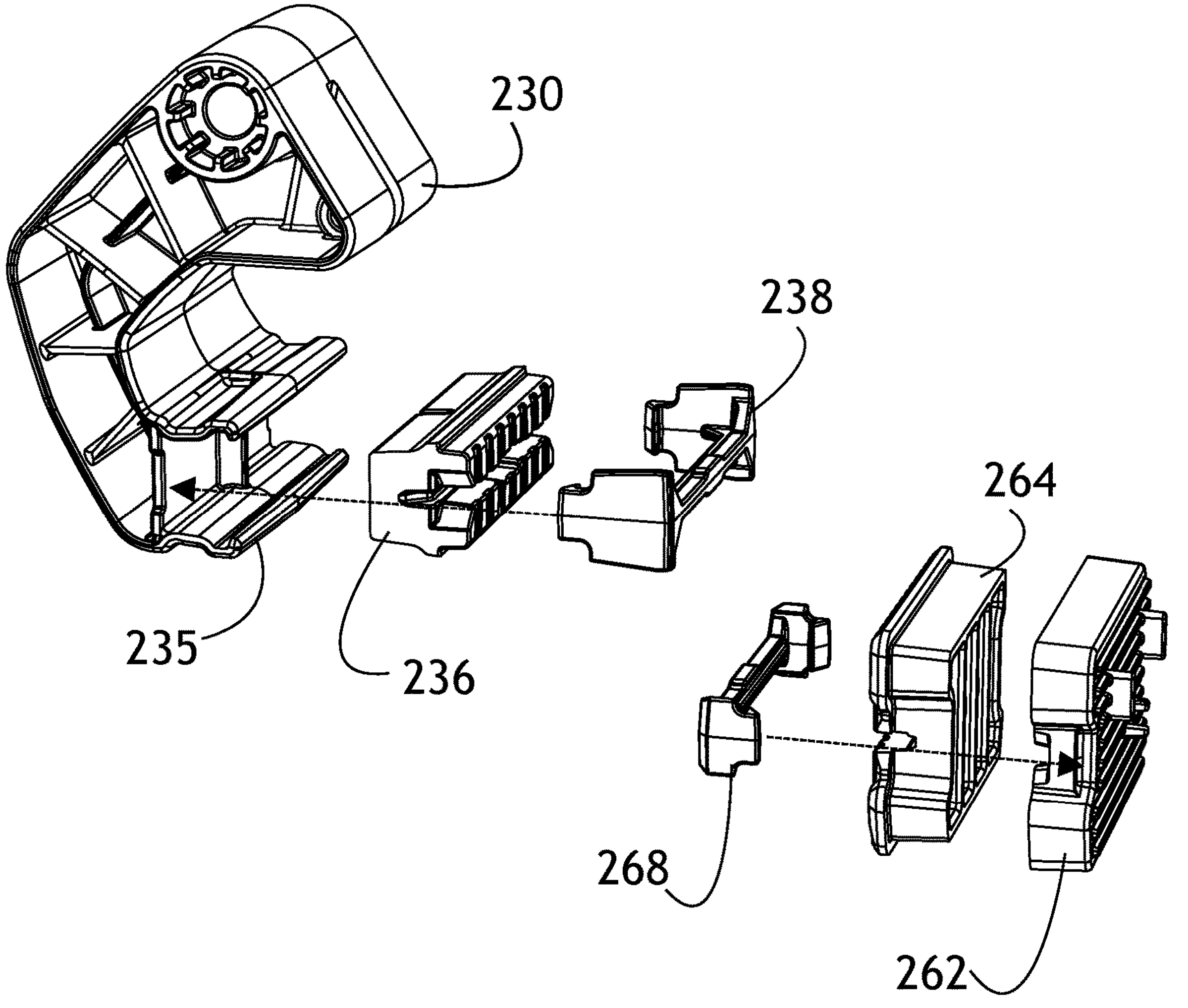
FIG. 16 is an exploded view of an alternate jaw construction for both the mandible and maxilla jaws.
Figure 17:
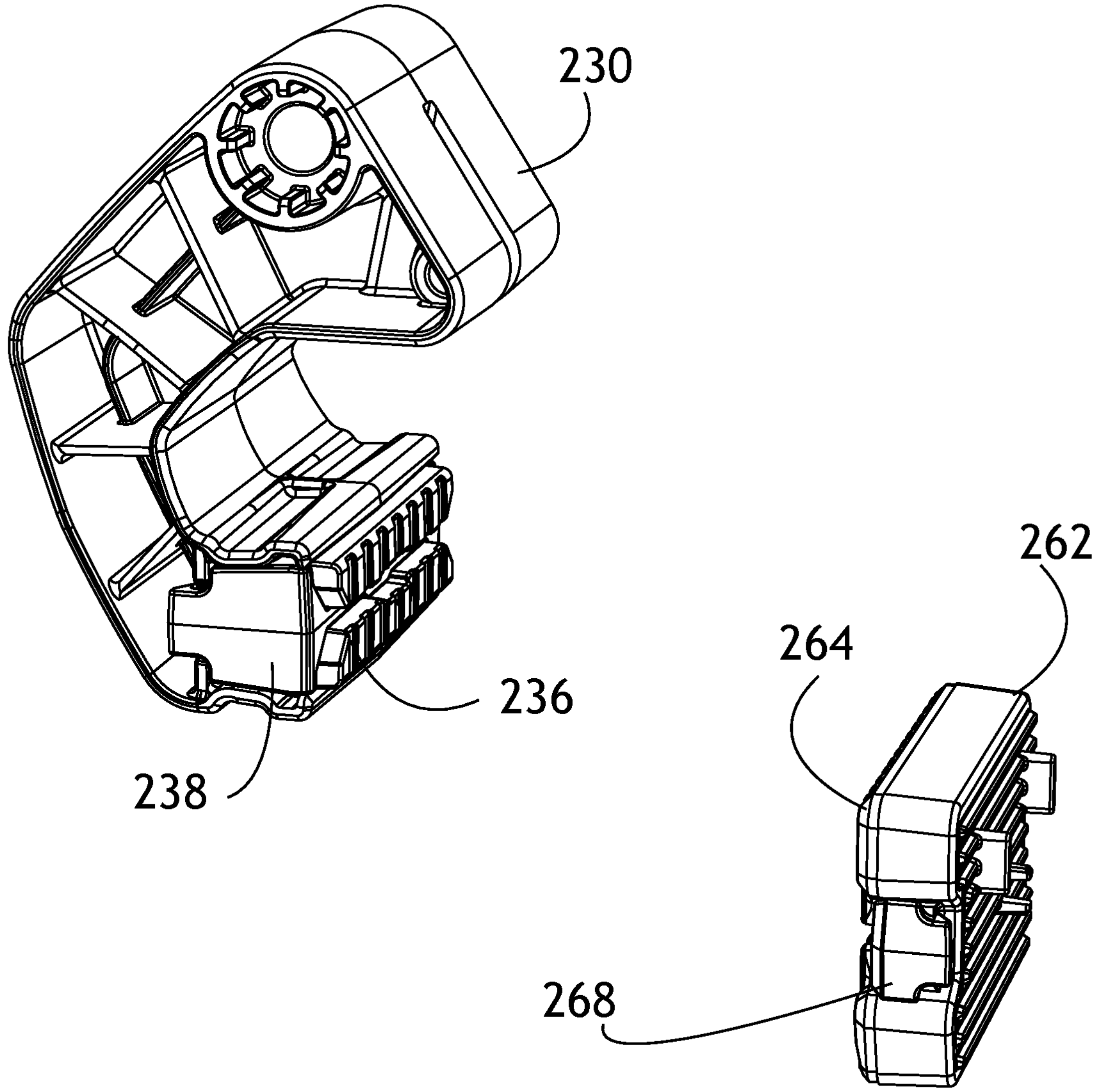
FIG. 17 is a perspective view of the jaws of FIG. 16.
Figure 18:
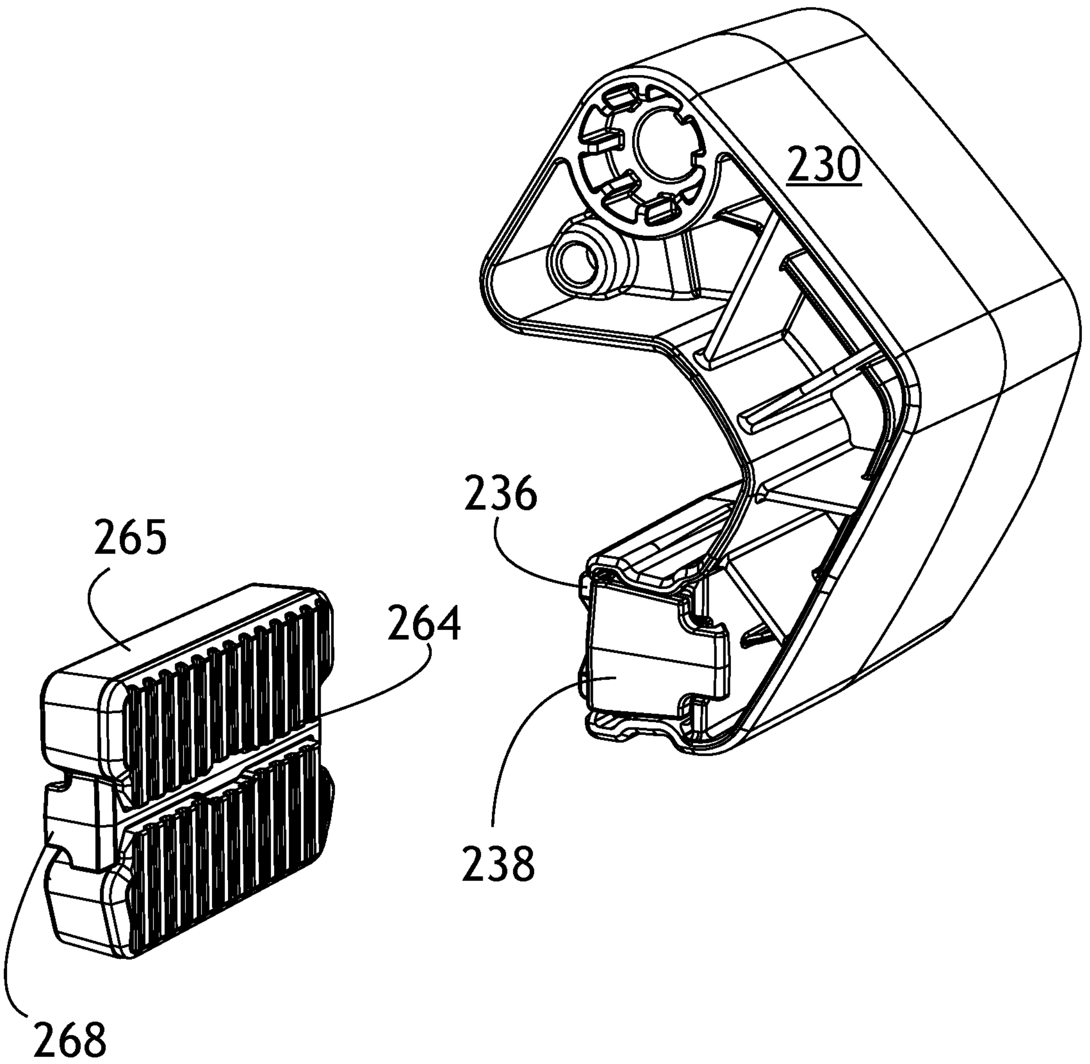
FIG. 18 is an alternate perspective view of the jaws of FIG. 16.

Jaw adjustability may be accomplished by providing an alternate attachment structure for selectable strips, as is shown in FIGS. 16 and 17. The mandible (230) may be constructed with a cradle or socket (235) which would receive a selectable mandible strip (236). This mandible strip (236) could then be secured with a securement clip (238) which could extend over and around the strip (264) and clip into the walls or edges of the cradle (235). This structure may be utilized for the maxilla as well, with selectable strips (264) secured to a maxilla cradle (262) through a similar clip paradigm (268)

INDUSTRIAL APPLICABILITY

While devices as described and illustrated will be found very effective in achieving the objects for which the invention has been devised, it will be understood that the embodiment described is illustrative only and may be subject to many modifications of constructional detail and design, as will be readily apparent to persons skilled in the art and without departing from the broad scope and ambit of the invention as defined by the appended claims. Either of the described improvements may be utilized independently of the others, as may the use of any two in tandem, however the use of all three in conjunction with each other is preferred.

I claim:

1. A ladder safety device comprising:

a ladder locking bar mounted upon a ratcheting variable height carriage, the ratcheting variable height carriage further comprising:

a carriage body slidably inserted within a body of the ladder safety device, the body of the ladder safety device comprising internal and opposed ratcheting matrices proximate the carriage body;

the carriage body presenting at least one ratcheting tooth positioned to interface with at least one of the ratcheting matrices; and the at least one ratcheting tooth located on at least one outwardly biased compression tab;

an over-center mandible jaw with an adjustable crown; and a maxilla jaw with a replaceable surface;

wherein the at least one ratcheting tooth and ratcheting matrices interact to allow motion of the variable height carriage in one direction, but compressing the at least one compression tab is required to allow motion of the carriage in an opposite direction.

2. The ladder safety device of claim 1, the adjustable crown further comprising:

a threaded socket within the mandible jaw; and a threaded adjustment bolt upon which the crown is mounted.

3. The ladder safety device of claim 1, the mandible jaw further comprising a receiving cradle and at least one selectable mandible strip interfacing with the receiving cradle.

4. The ladder safety device of claim 3, the at least one selectable mandible strip being fastened to the receiving cradle by a mandible clip extending over and around the strip and interfacing with the cradle.

5. The ladder safety device of claim 1, the adjustable crown further comprising:

a mandible socket with edges;

a selectable mandible strip insertable within the mandible socket; and a clip positionable over and around the selectable mandible strip such that edges of said clip interface with the edges of the mandible socket.

6. The ladder safety device of claim 5, the at least one selectable mandible strip being fastened to a receiving cradle of the mandible jaw by the mandible clip extending over and around the at least one selectable mandible strip.

7. The ladder safety device of claim 1, the mandible jaw further comprising a receiving cradle and at least one selectable mandible strip interfacing with the receiving cradle.

8. The ladder safety device of claim 7, the at least one selectable mandible strip being fastened to the receiving cradle by a mandible clip extending over and around the strip and interfacing with the cradle.

9. A ladder safety device comprising:

a ladder locking bar mounted upon a ratcheting variable height carriage;

an over-center mandible jaw with an adjustable crown, said adjustable crown further comprising:

a receiving cradle;

at least one selectable mandible strip interfacing with the receiving cradle; and a clip extending over and around the strip and interfacing with the cradle;

a maxilla jaw with a replaceable surface;

wherein the clip, by extending over and around the mandible strip and interfacing with the receiving cradle, fastens the mandible strip to the receiving cradle.

10. A ladder safety device comprising:

a ladder locking bar mounted upon a ratcheting variable height carriage, an over-center mandible jaw with an adjustable crown; and a maxilla jaw with a replaceable surface; the adjustable crown further comprising:

a mandible socket with edges;

a selectable mandible strip insertable within the mandible socket; and a clip positionable over and around the selectable mandible strip such that edges of said clip interface with the edges of the mandible socket.

11. The ladder safety device of claim 10, the adjustable crown of the mandible jaw further comprising a receiving cradle and the selectable mandible strip interfacing with the receiving cradle.

12. A ladder safety device comprising:

a ladder locking bar mounted upon a ratcheting variable height carriage, an over-center mandible jaw with an adjustable crown, the mandible jaw further comprising a receiving cradle and at least one selectable mandible strip interfacing with the receiving cradle; and a maxilla jaw with a replaceable surface;

wherein the at least one selectable mandible strip is fastened to the receiving cradle by a clip extending over and around the strip and interfacing with the cradle.

* * * * *